(No Model.)
D. M. & T. H. PARRY.
TWO WHEELED VEHICLE.
No. 398,178. Patented Feb. 19, 1889.
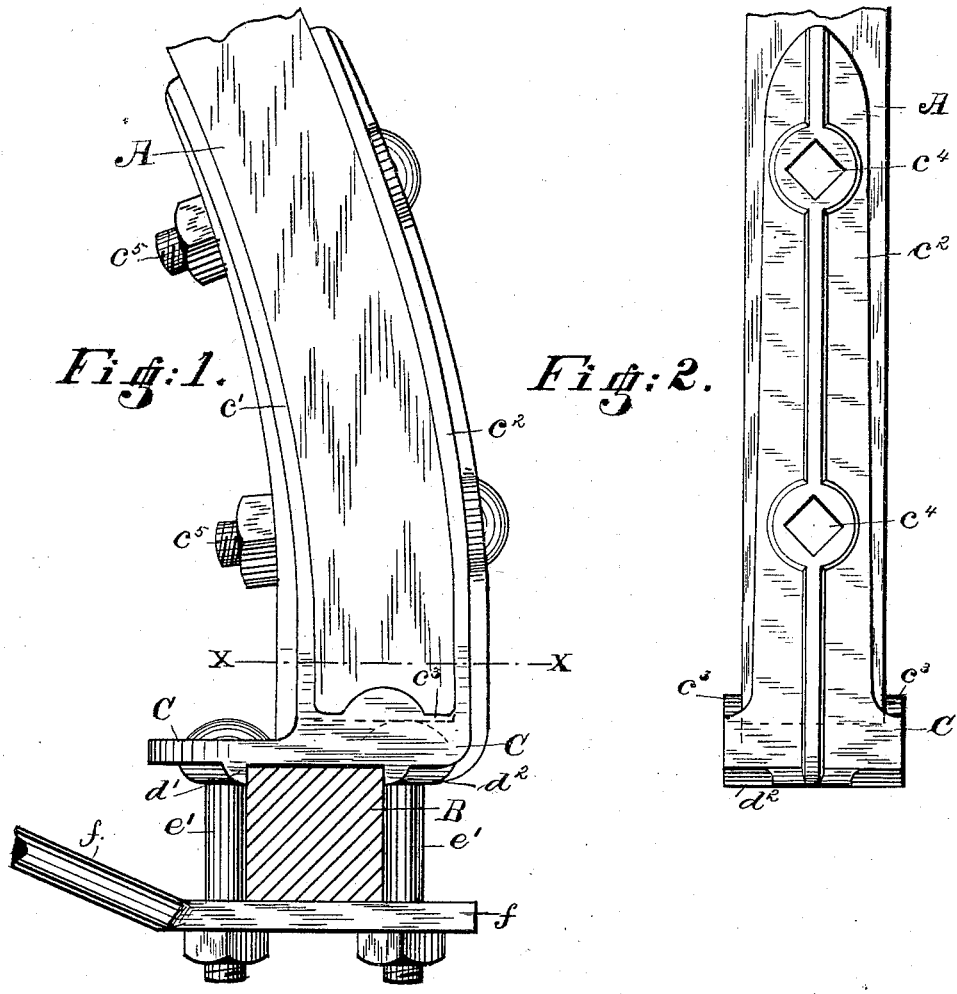
Witnesses:
N. E. C. Whitney.
Edward Meredith.
Inventors.
David M. Parry & Thomas H. Parry.
by Joseph A. Minturn
Attorney

UNITED STATES PATENT OFFICE.

DAVID M. PARRY AND THOMAS H. PARRY, OF INDIANAPOLIS, INDIANA.

TWO-WHEELED VEHICLE.

SPECIFICATION forming part of Letters Patent No. 398,178, dated February 19, 1889.

Application filed November 17, 1888. Serial No. 291,162. (No model.)

*To all whom it may concern:*

Be it known that we, DAVID M. PARRY and THOMAS H. PARRY, citizens of the United States, residing at Indianapolis, in the county of Marion and State of Indiana, have invented certain new and useful Improvements in Two-Wheeled Vehicles; and we do hereby declare the following to be a full, clear, and exact description of the invention, such as will enable others skilled in the art to which it appertains to make and use the same.

This invention appertains to improvements in two-wheeled vehicles, and relates especially to a shaft-clip therefor and to its special construction, and to the combination and arrangement of the shaft-clip, shaft, and axle, the object of the invention being to construct a simple and durable clip to engage the shaft and axle, and so combine and arrange the parts that the shaft will be connected by the clip to the axle above the same and in a plane vertically central, or substantially so, with relation to the rear edge of said axle, to thereby bring the weight upon the axle as nearly central as possible, the spring of the vehicle with this construction of clip being movably secured to shafts by suitable devices, which will not in this application be illustrated, as they constitute no part of the present invention.

With this object in view the invention consists in the special construction of a shaft and axle clip, and in the combination and arrangement of the shaft, clip, and axle, substantially as hereinafter described, and set forth in the claims.

Inasmuch as our invention consists, as above stated, only in an improved clip and in the combination and arrangement of parts connected therewith, we deem it unnecessary to illustrate an entire vehicle, and simply show the parts which comprise the subject-matter of this application.

Figure 1 represents in side elevation a portion of a two-wheeled-vehicle shaft and its axle with our improved clip attached, the axle being shown in section; Fig. 2, a rear view of the clip detached; Fig. 3, an under side view of the clip detached; and Fig. 4, a horizontal cross-section on dotted line $x\ x$, Fig. 1.

The clip, which secures the shaft A to the axle B, (which shaft and axle may be of the usual construction,) consists of a horizontal base-plate, C, having two upright arms, $c'\ c^2$, slightly curved in the direction of the length of the plate C and remote from each other, one of the arms, $c^2$, being extended upward from the rear end of the plate C, while the one $c'$ extends upward approximately centrally between the ends of said plate, the inner faces of the arms $c'\ c^2$ being smooth and flat.

Extending upward from the two sides of the plate C, and reaching from arm $c'$ to arm $c^2$, is a thin flange, $c^3$, which flange closes the sides of the arms at their lower end, thus forming a box-like or square socket, $d$, to receive the lower square end of the shaft and hold it firmly against lateral movement, to thereby relieve the bolts which secure the clip to the shaft from undue strain, which will in a great measure obviate the cracking or splitting of the shaft at the connection. Through the arms $c'\ c^2$ are formed bolt-holes $c^4$, through which are extended the bolts $c^5$, that secure the clip to the shaft, said shaft resting between the inner faces of the said arms, as clearly shown in Fig. 1.

Formed upon the under side of the plate C, and extending in the direction of the width of said plate, are two vertical flanges, $d'\ d^2$, they being a distance apart equal to the width of the axle B, which they embrace at the front and rear sides. The inner face of the rear flange, $d^2$, will preferably be in a direct vertical line with the transverse central line of the lower end of the shaft A or its receiving-socket $d$, to thereby bring the central line of the lower end of the shaft in a vertical line with the rear edge of the axle B, or bring the lower end of said shaft in the rear of the front edge of the axle, to thereby concentrate the weight force of the vehicle at a point as nearly in a line with the axle as possible to reduce or relieve the forward end of the shafts when secured to the horse from unnecessary weight, securing thereby nicety of balance and ease in riding. The clip is secured to the axle by bolts $e'$, extended through the plate C vertically at the front and rear edges of the axle, and through a metal strap, $f$, at the lower face of the axle B, as shown in the drawings.

If desired, the rear upwardly-projecting arm, $c^2$, might be dispensed with and a separate washer used to bear against the rear face of the shaft A; but the construction shown in the drawings is preferable.

The strap $f$, which supports the axle at the lower side, will preferably be of wrought metal and be extended forward and attached to a cross-bar (not shown) upon the shafts to form a brace.

We claim—

1. A clip to connect the shafts and axle of two-wheeled vehicles, comprising the base-plates C, each having the two upwardly-extended arms $c'$ $c^2$ to engage the front and rear sides of the shaft, as shown, and having the flanges $d'$ $d^2$ to embrace the upper edges of the axle, the strap $f$ to engage the lower part of the axle, and the bolts to secure the said parts together, substantially as set forth.

2. In a two-wheeled vehicle, the combination of the clip, consisting of the horizontal plate C, having the socket $d$ at its upper face, the transverse vertical flanges $d'$ $d^2$ at its lower face, and the upwardly-projecting curved arms $c'$ $c^2$, the shaft A, secured by bolts between the inner faces of the arms $c'$ $c^2$, the strap $f$, and the axle B, secured between the strap, lower face of the plate C, and between the inner walls of the flanges $d'$ $d^2$, with its rear edge in a line, or approximately so, with the center of the lower end of the shaft, and secured in place by the vertical bolts extended through the plate C, and strap $f$, substantially as shown, and for the purpose set forth.

In testimony whereof we affix our signatures in presence of two witnesses.

DAVID M. PARRY.
THOMAS H. PARRY.

Witnesses:
W. O. SHIREY,
N. E. C. WHITNEY.